United States Patent [19]
James et al.

[11] Patent Number: 5,815,695
[45] Date of Patent: Sep. 29, 1998

[54] METHOD AND APPARATUS FOR USING CONDITION CODES TO NULLIFY INSTRUCTIONS BASED ON RESULTS OF PREVIOUSLY-EXECUTED INSTRUCTIONS ON A COMPUTER PROCESSOR

[75] Inventors: David V. James, Palo Alto; Mario D. Nemirovsky, San Jose, both of Calif.

[73] Assignee: Apple Computer, Inc., Cupertino, Calif.

[21] Appl. No.: 479,228

[22] Filed: Jun. 7, 1995

Related U.S. Application Data

[63] Continuation of Ser. No. 144,925, Oct. 28, 1993, abandoned.

[51] Int. Cl.$^6$ .................................................... G06F 9/30
[52] U.S. Cl. ............................................ 395/561; 395/581
[58] Field of Search ............................ 395/561, 567, 395/580, 581, 800

[56] References Cited

U.S. PATENT DOCUMENTS

| | | | |
|---|---|---|---|
| 4,569,016 | 2/1986 | Hao et al. | 395/565 |
| 4,589,087 | 5/1986 | Auslander et al. | 364/768 |
| 4,654,785 | 3/1987 | Nishmiyama et al. | 395/581 |
| 4,739,471 | 4/1988 | Baum et al. | 395/566 |
| 4,742,453 | 5/1988 | Shibuya | 395/581 |
| 4,873,627 | 10/1989 | Baum et al. | 395/567 |
| 5,041,968 | 8/1991 | Yamaguchi | 395/384 |
| 5,051,896 | 9/1991 | Lee et al. | 395/567 |
| 5,125,092 | 6/1992 | Prener | 395/706 |
| 5,193,157 | 3/1993 | Barbour et al. | 395/581 |
| 5,193,206 | 3/1993 | Mills | 395/800.41 |
| 5,226,127 | 7/1993 | Fu et al. | 395/584 |
| 5,274,777 | 12/1993 | Kawata | 395/394 |
| 5,469,551 | 11/1995 | Sites et al. | 395/586 |

OTHER PUBLICATIONS

"AIX Version 3.2 for RISC System/6000, Assembler Language Reference", Second Edition, International Business Machines Corp., pp. 5–21—5–32, 5–43—5–50 (Jan. 1992).
"PA–RISC 1.1 Architecture and Instruction Set, Reference Manual", Hewlett Packard Company, pp. 4–6—4–8, 5–71—5–80, 5–83—5–84 (Nov. 1990).
"Arm 600 32–Bit Enhanced Microprocessor", VLSI Technology, Incorporated, pp. 1–5, 7, 10–13, (Jun. 1992).
"PowerPC 601 RISC Microprocessor User's Manual", Motorola, pp. 10–31 (1993).

Primary Examiner—Parshotam S. Lall
Assistant Examiner—Viet Vu
Attorney, Agent, or Firm—Helene Plotka Workman

[57] ABSTRACT

The invention is a method and apparatus for conditionally nullifying a current instruction based on a first test value where the first test value can be set in one or more prior instructions and where the execution of the current instruction can set a second test value without affecting the first test value. The one or more prior instructions which set the first test value need not immediately precede the current instruction. In a preferred embodiment, a test value comprises multiple bits, each bit capable of representing a unique state. A mask is provided to select the bits which are being tested. Also, means are provided for specifying an logical operation to be performed on the test values. The invention permits multiple status test results to be saved and concurrently tested in a single branch instruction.

27 Claims, 5 Drawing Sheets

METHOD AND APPARATUS FOR USING CONDITION CODES TO NULLIFY INSTRUCTIONS BASED ON RESULTS OF PREVIOUSLY-EXECUTED INSTRUCTIONS ON A COMPUTER PROCESSOR

This is a continuation of application Ser. No. 08/144,925 filed Oct. 28, 1993, abandoned.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD OF THE INVENTION

This invention relates generally to executing instructions in a computer processing system and, more specifically, to conditionally nullifying the effect of an instruction based upon one or more test values, the test values capable of being set in any previous instruction and capable of being set within a same instruction after a test of the values, unless the test of the values results in nullification of that instruction.

BACKGROUND OF THE INVENTION

Typically, a processor architecture provides instructions for comparing two or more values or for performing an arithmetic operation and setting at least one condition code based on the result of the compare or arithmetic operation. Such condition codes may indicate, for example, a less-than-zero condition, a greater-than-zero condition, an equal-to-zero condition and an overflow condition. One or more condition codes, depending on the processor architecture, can then be used to conditionally nullify an instruction based on the values of the condition codes.

In processor architectures in which instructions are pipelined, the timing of the setting of condition codes can affect performance. Pipelining is used to allow virtually all parts of processor and memory systems to operate continuously. In a pipelined architecture, typically, while one instruction is being executed, its successor is being decoded, and a third instruction is being fetched. A pipelined architecture presents several issues related to timing and branching.

In a pipelined architecture it is typically desirable to perform an operation which sets a condition code a sufficient amount of time prior to an instruction which conditionally executes based on the value of that condition code so that execution of that instruction is not delayed while waiting for the condition code to be calculated. Therefore, an operation setting the condition code is preferably positioned in the instruction stream more than one instruction prior to a conditional instruction based on its result. Some traditional processor architectures constrain the use of the condition code so it can affect only an immediately following instruction.

Moreover, in a heavily pipelined system it is desirable to minimize the number of performed branching operations because branches force the flushing of hardware pipelines. When a branch operation is executed, pre-fetched instructions, which would have been executed had the branch operation not executed, are discarded and new instructions based on the branch are fetched. This results in additional cycles being used to fetch the new instructions. Also, the flushing of the pipeline means that the benefits of pipelining are not realized for the pre-fetched instructions which are discarded.

Some systems include branch predictors, either hardware or software, e.g. software compilers, which can reorder code and affiliated branches so that the number of taken branches will typically be reduced. Although this can reduce the effective penalty of executing conditional branches, this does not eliminate the branch instructions themselves. The actual effectiveness of the branch predictors depends upon the correctness of the predictions. However, such predictions typically have an inherent margin of error.

To highlight the above problems it is useful to examine some existing processor architectures. In a PA-RISC 1.1 processor architecture developed by Hewlett-Packard Company, a nullify bit can be set to conditionally nullify an instruction executed immediately following the instruction which set the condition bit. For background information on the PA-RISC 1.1 architecture see "PA-RISC 1.1 Architecture and Instruction Set, Reference Manual", Hewlett-Packard Company, 1990.

For branch instructions, the nullify bit is used for code compaction. When a branch is taken, the instructions after a branch will be fed into the pipeline, thereby causing a delay. The slot containing the instruction after the branch is typically called a "branch-delay slot." To solve this delay problem some architectures always execute the instruction in the delay slot independently of the outcome of the branch. Therefore, an instruction that is independent of the branch should be used in this slot.

In the absence of useful instructions that can be executed, an instruction having no effect, typically called a "NOOP" instruction is placed in the branch-delay slot. However, when an unconditional instruction that is independent of the branch condition precedes the branch, that instruction is placed in the branch-delay slot. If such an independent, unconditional instruction is not available, then the compiler attempts to determine which branch direction is likely to be taken and places in the branch-delay slot the first instruction from the code sequence corresponding to that branch direction, Thus, the use of the nullify bit in a branch instruction is primarily for code compaction, rather than the execution of conditional operations.

A computational instruction can perform a test and set the nullify bit, thereby affecting the execution of the immediately following instruction. An instruction which conditionally executes based upon the value of the nullify bit should immediately follow the appropriate instruction which sets the nullify bit, since intermediate instructions may change the value of the nullify bit.

However, in the PA-RISC architecture a single instruction can not be used to set or check multiple conditions. Thus, for example to branch based on the outcome of two tests, test a and test b, the following steps typically occur:

performing test a and setting a nullify bit;

checking the value of the nullify bit and branching to test b accordingly;

performing test b and setting the nullify bit;

checking the value of the nullify bit and branching accordingly.

Thus, depending on the relationship between the tests being performed, i.e. which logical operation is being examined, e.g. test a AND test b, the number of branches may be equal to the number of conditions being checked. This can be problematic because each taken branch can significantly affect the number of processor cycles which are wasted when a pipeline is flushed of pre-fetched instructions.

In a PowerPC 601 architecture conditional branch instructions operate by branching according to the value of a bit within a Condition Register. The Condition Register contains 32 bits, arranged in 8 groups of four bits. Each set of four bits indicates a less-than-zero condition, a greater-than-zero condition, an equal-to-zero condition and a summary overflow condition. The PowerPC 601 RISC microprocessor is described in "PowerPC 601 RISC Microprocessor User's Manual", Motorola, Inc., 1993. PowerPC is a trademark of International Business Machines Corporation.

In the PowerPC 601 architecture some arithmetic instructions can operate on any of the 32 bits in the Condition Register and then set any of the 32 bits. For example, in the CRAND instruction, described on page 10–31 of the "PowerPC 601 RISC Microprocessor User's Manual", a first operand specifies a destination bit in the Condition Register in which to store the result of a logical AND operation on two source bits in the Condition register, the two source bits being specified by a second and third operand in the instruction.

Other instructions in the PowerPC 601 architecture specify which one of the 8 groups of four bits to set and then all of the four bits in that specified group are set based on the result of the execution of the instruction.

In the PowerPC 601 architecture, to branch according to the value of two condition bits in the Condition register, an additional instruction is used to perform a logical operation on the condition bits and to store the result in a condition bit. The conditional instruction is then executed depending on the value of the stored result. For example, to perform the high level operation IF (C0 AND C1) ERROR=1 the following RS/6000 instructions are invoked:

```
CRAND C2, C0, C1
IF (C2)
    ERROR = 1
```

In an ARM600 processor, commercially available from VLSI Technology, Inc., there is a single group of condition code bits and any conditional instruction can set all or none of the bits in the group. Thus, two conditions can not be tested before branching because the testing of the second condition will overwrite the results from the testing of the first condition. The value of condition code bits can affect ALU instructions as well as branches so that in order to conditionally execute a small number of instructions, the instructions can be placed as a group after the instruction which sets the condition code and can be conditionally executed without the taking of a branch. Typically, a conditionally executed instruction includes a portion which specifies which combination of the condition code bits will nullify the execution of the instruction.

The condition code bits set by an instruction are used by the next instruction in the instruction stream which will preserve or reset the values of the condition codes. Thus, the values of the condition codes set during a compare instruction are valid until overwritten by a following compare instruction. Thus, in order for a branch instruction to rely upon values of the condition code bits set by a particular compare instruction, it must follow the particular compare instruction in the instruction stream such that another compare instruction is not executed between the particular compare instruction and the branch instruction.

SUMMARY OF THE INVENTION

Briefly, the invention is a method and apparatus for conditionally nullifying a current instruction based on a first test value where the first test value can be set in one or more prior instructions and where the execution of the current instruction can affect a second test value, thereby permitting a test value to be valid until it is explicitly overwritten. Thus, the one or more prior instructions which set the first test value need not immediately precede the current instruction. Moreover, a test value can be used by any number of subsequent instructions as long as the test value is not overwritten by a subsequent test value.

In addition to testing multiple conditions within a single instruction, the invention also allows within that same instruction one or more of the test states to then be set based on the result of an arithmetic operation which is performed if the instruction is executed. The test state bit being set can differ from those which were used in the initial test to determine execution.

Since the invention provides for the testing of multiple test states within a single instruction, the number of branches are reduced. For example, to conditionally nullify an instruction based on two conditions being true, the invention allows the following high level notation: if (t0 & t1) {a=b+c}. In that case, the values of t0 and t1 are logically AND'ed within that instruction and then if the result is true, the rest of the instruction is executed. The invention in that case uses one instruction which is not a branch. In contrast, prior architectures which do not permit the testing of multiple conditions within a single instruction would first test whether t0 was true and if it was then it would branch to a test of whether t1 was true and then depending on the outcome of the test, it may branch again. In this case, there are typically two branches in addition to the computation "a=b+c" instruction.

Since the invention provides for conditional nullification of an instruction, the number of branches are even further reduced. For example, in some prior architectures, the absolute value of a number, herein denoted as "x", typically is determined by first checking whether x is less than zero. If x is less than zero then the processor branches to code which sets x equal to −x.

However, in an architecture incorporating the invention, an absolute value of x can be computed in the following manner. In a first instruction, a test is performed on whether x is less than zero and a test value is set accordingly. In a second instruction, if the test value set in the first instruction indicates that x is less than zero then x is set to −x. The invention conditionally affects the execution of an instruction rather than performing branch, operations.

In addition, the invention allows a second test value to be set within the same instruction as the check of a first test value, where the first and second test values may be the same or different entities, if the check of the first test value results in the execution of, rather than the nullification of, the instruction. For example, this functionality can be represented in a high level language in the following manner: if (t0 & t1) {a=b+c; t2=(a<0)}.

Since the values of the conditions being tested can be set by previous instructions which are not necessarily immediately preceding the instruction containing the test, the values of the conditions can be set in clock cycles preceding the clock cycle of the test itself. This is particularly useful in heavily pipelined systems where results aren't known in the following instruction. For example, a test for an all zero value may take longer than a normal cycle. Another example is a superscalar architecture executing multiple instructions simultaneously. For descriptive purposes a superscalar architecture for executing two instructions simultaneously is used. In that case, the test of the conditions should be positioned in the pair of instructions preceding the pair of instructions containing the instruction which conditionally executes based on the result of that test. The test of conditions should not be positioned in the same pair as the instruction which conditionally executes based on the result of that test because delays waiting for the result of the test would turn the superscalar into a sequential rather than parallel processor. Thus, the invention avoids this problem by allowing the test of the conditions to be positioned in the instruction execution stream substantially before an instruction which conditionally executes based on the result of that test.

The invention provides several advantages. It permits conditional nullification based on more than one test result without requiring additional instructions to merge these results. It also allows a single test result value to be set, thereby potentially using less storage than saving all condition code bits. Moreover, since test results can be set individually, rather than as a group, and since the same instruction can check one test result and set another test result, a second test can be performed without overwriting the results of a first test. Thus, a test result value can be valid for any subsequent instruction and is not restricted to the immediately following instruction. Moreover, a test result can be used by more than one subsequent instruction.

The invention also provides for multiple test result bits, while some prior architectures use either condition code groups of bits. For example, in the PowerPC 601 architecture, to test multiple test results, several instructions are typically used to combine the condition code groups of bits into a single result value which is then used to conditionally execute. The invention simplifies the testing of multiple test results because partial test specifications are performed when a test result is set. For example, if t0 is set for a≠b and t1 is set for c≧d, then a test for (a≠b AND c≧d) can be performed by logically AND'ing t0 and t1.

Moreover, the invention allows for multiple status test results to be saved and concurrently tested in a single branch instruction. In addition, the invention allows more than one test result to affect the conditional execution of an instruction other than a branch instruction. For example, an ALU instruction can be inhibited by nullifying the register update, thereby nullifying the effect of the ALU instruction.

BRIEF DESCRIPTION OF THE DRAWINGS

The above and further advantages of the invention may be better understood by referring to the following description in conjunction with the accompanying drawings, in which.

DETAILED DESCRIPTION OF THE DRAWINGS

Figure 1:
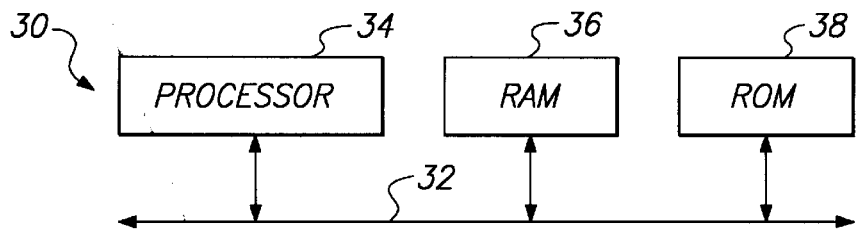
FIG. 1 is a symbolic, simplified block diagram of a system which may incorporate the invention.

Numeral 30 in FIG. 1 generally indicates a computer of the type which can incorporate the invention. Computer 30 comprises a system bus 32 interconnecting a processor 34, a main memory which is typically implemented in the form of a random access memory (RAM) 36 and a static memory that can comprise a read only memory (ROM) 38.

The processor 34 is a microprocessor. For example, the processor may be a SPARC microprocessor commercially available from Sun Microsytems, Inc. or a PowerPC microprocessor commercially available from International Business Machines Corporation. The following description of a preferred embodiment includes a microprocessor having a traditional load/store architecture. However, the invention is not limited to a particular architecture and is equally applicable to other architectures such as those that directly manipulate memory. As used in the following description, the term "data storage means" can refer to a register, register file, memory or other data storage unit.

Figure 2:
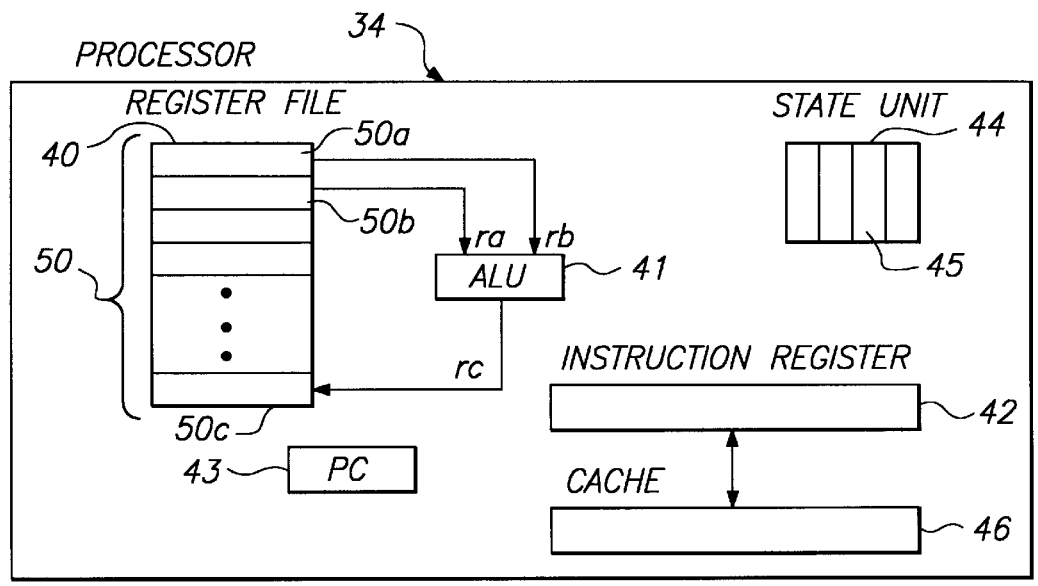
FIG. 2 is a block diagram of a processor having a load/store architecture which can be used in the system of FIG. 1.

As shown in FIG. 2, the processor 34 typically contains a register file 40, an arithmetic logical unit 41, called an "ALU", an instruction register 42, a program counter 43 and a state unit 44. Optionally, the processor 34 contains a cache 46. In a traditional load/store architecture data is moved between registers and memory without computation and computation is performed between values in registers. Typically, a processor 34 fetches an instruction 52 from cache 46 or memory 36 and stores it in the instruction register 42.

Register file 40 contains a plurality of general registers 50 including a register "ra" 50a, a register "rb" 50b and a register "rc" 50c. These registers are a specified byte length, typically 4 or 8 bytes depending on the implementation.

The state unit 44 can be any type of data structure capable of indicating one or more test values. For example, the state unit 44 comprises one or more state indicators 45, where each state indicator can be a bit, integer or other data structure. Alternatively, the state unit 44 can be a plurality of bits or other form of data structure or storage capable of storing multiple test results, also called test states or test values. Preferably, the state unit comprises a plurality of bits, each bit indicating a particular test result. The state unit 44 typically resides in a special purpose register in the processor.

A test value can be any data type capable of indicating two or more states. For example, a test value can be a single bit, multiple bits, a single bit within a series of multiple bits or an integer. In the following description, a test value may also be called a test result or a test state.

In a preferred embodiment, a test value comprises multiple bits, each bit capable of representing a unique state. A mask is provided to select the bits which are being tested. Also, means are provided for specifying an logical operation, also called a "test", to be performed on the test values. Such tests may be for example an AND or a NAND operation such as (t0 AND t1). Thus, the invention allows multiple conditions to be checked within a single instruction.

The first test value and the second test value can be the same entity. For example, a bit can be used to determine whether to execute an instruction and then if that instruction is executed that same bit can be set accordingly. On the other hand, the first test value and the second test value can be different bits, thereby permitting the testing of one test value and the setting of a different test value.

Test values are set according to a status resulting from a computational or logical operation and according to a condition specifier typically specified in a condition field of an instruction. Preferably, the status indicates condition codes which are mutually exclusive and such condition codes include "less than zero", "equal to zero" and "greater than zero". Optionally, the condition codes may include "overflow" and "carry conditions", but since detection of these conditions is possible without using additional condition codes, it is preferable not to include these conditions in the condition codes.

A condition code can be any data type capable of indicating multiple conditions or states. For example, a condition code can be a bit, multiple bits or an integer.

Figure 3:
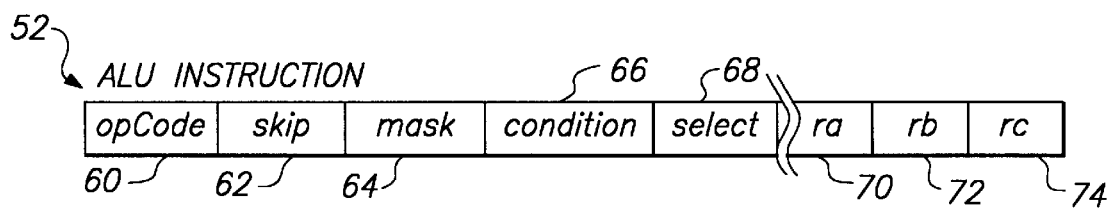
FIG. 3 shows a format of an ALU instruction incorporating the invention for use on the processor of FIG. 2.

FIG. 3 shows a format for an ALU instruction 52 embodying the invention on a microprocessor as shown in FIG. 2. An ALU instruction typically modifies a register or other storage unit such as memory after performing an arithmetic or logical operation on one or more operands. By conditionally enabling whether the modification, also called a "write", will occur, the effect of the modification can be skipped in certain circumstances, thereby eliminating the need to branch around instructions. Although nullifying the effect of an instruction, except for the incrementing of the program counter, wastes approximately one processor cycle, this is significantly less time than the typically four or five processor cycles used to branch around instructions.

The instruction 52 contains an opcode 60, a skip field 62, a mask field 64, a condition field 66, a select field 68 and three register number fields, herein called ra specifier 70, rb specifier 72 and rc specifier 74.

An opcode 60, also known as a "first field", specifies a particular instruction within the processor's instruction set. The opcode 60 uniquely identifies a particular instruction, either directly or indirectly. For example, opcode 60 can be a binary value such as "110000", corresponding to an ALU instruction such as an ADD instruction embodying the invention. The size of opcode 60 depends on the instruction set architecture, typically this is a 6-bit field.

The values of the skip 62 and mask fields 64 control whether this instruction will be skipped, i.e. nullified. In other words, these fields impact the effect of the instruction such as whether a destination register in an ALU instruction will be updated with the result of the ALU operation and/or whether test results will be saved. Preferably, when both fields 62 and 64 have a zero value, the instruction is unconditionally executed so that when the skip and mask fields are not being utilized they do not have to be set to special values to indicate unconditional execution.

The skip field 62 can be any data type capable of indicating at least two states, an execute state and a nullify state and capable of being switched between the at least two states. For example the skip field 62 can be a single bit.

The mask field 64 can be any data type capable of selecting a test result, i.e. a state indicator 45, from within the state unit 44. For example, when a state unit 44 comprises multiple bits, where each bit is a state indicator 45, the mask field comprises multiple bits, where each bit corresponds to a bit in the state unit 44. If the state unit 44 has a 4-bit length, then the mask field has a 4-bit length, where bit zero of the mask field corresponds to bit 0 of the state unit. Each bit in the mask field 64 is capable of indicating a first state specifying selection of the corresponding bit in the state unit 44 and a second state specifying non-selection of the corresponding bit in the state unit 44. Thus, to select one or more bits in the state unit, a compiler (not shown) which generates the instruction sets the corresponding bit or bits in the mask field to the first state and the remaining bits to the second state.

The skip field 62 and mask field 64 operate in the following manner. The value of the skip field 62 indicates whether to nullify the instruction if the values of the bits in the state unit 44 specified by the mask field 64 are all TRUE.

Preferably, the skip field 62 is a bit having a first state indicating that an instruction should not be nullified and a second state indicating that an instruction should be nullified. For example, the first state can be a "0" value and the second state can be "1" value.

If the values of the skip field 62 and mask field 64 cause the instruction to not be nullified, then the values of the condition field 66 and the select field 68 affect how the status conditions affect the value of the test results being saved in the state unit.

Preferably, status conditions are mutually exclusive, i.e. "less than zero", "greater than zero", or "equal to zero". In that case, a value which does not indicate one of the conditions can be designated as a "DO NOT WRITE" value. When the condition field 66 of an instruction specifies a DO NOT WRITE value, the test result(s) generated during the execution of the instruction are not saved in the state unit 44. Preferably, a DO NOT WRITE value is zero.

Other options which can be used whether or not the status conditions are mutually exclusive include, but are not limited to the following. First, a special value for the select field 68 can be used to indicate that the test results are not to be saved. Second, a separate bit or flag can be used to indicate whether the test results are to be saved. Third, test results can be saved in each instruction, thereby eliminating the need for a DO NOT WRITE indicator.

The condition field 66 contains data which specifies the status conditions which are checked to generate a test result, while the value of the select field specifies which portion of the state unit 44 to set to the test value. For example, if the state unit 44 comprises a plurality of bits, then the select field specifies which bit in the state unit to modify.

The ra specifier 70, also known as a "second field" specifies register ra 50a. Ra specifier 70 can be an index, offset or pointer into the register file for register ra 50a.

The rb specifier 72, also known as a "third field", specifies register rb 50b. Rb specifier 72 is similar to Ra specifier 70.

The rc specifier 74, also known as a "fourth field", specifies register rc 50c. Rc specifier 74 is similar to Ra specifier 70 and Rb specifier 72.

The size of the three register fields 70, 72 and 74 depends on the number of registers supported. Typically, they are 5-bit fields.

Figure 4:
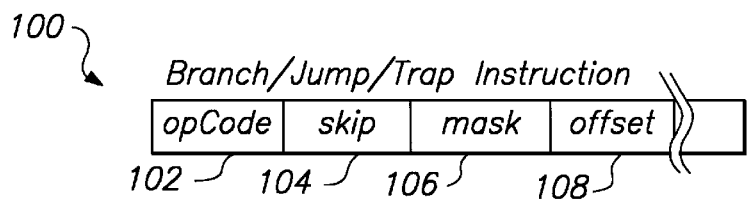
FIG. 4 illustrates a format of a BRANCH instruction incorporating the invention for use on the processor of FIG. 2.

FIG. 4 illustrates a format 100 for a branch or branch-like instruction for use on microprocessor shown in FIG. 2. The format 100 contains an opcode 102, a skip field 104, a mask field 106 and an offset field 108. The opcode 102, skip field 104 and mask field 106 are analogous to opcode 60, skip field 62 and mask field 64, respectively, operating in a similar manner as previously described. The value of the offset field 108 specifies either directly or indirectly a location to which the branching should occur if the branch instruction is executed. Typically, the offset field 108 specifies an offset, i.e. a number of instruction words or bytes, which is added to the value of the program counter to effectuate a branch operation.

Figure 5:
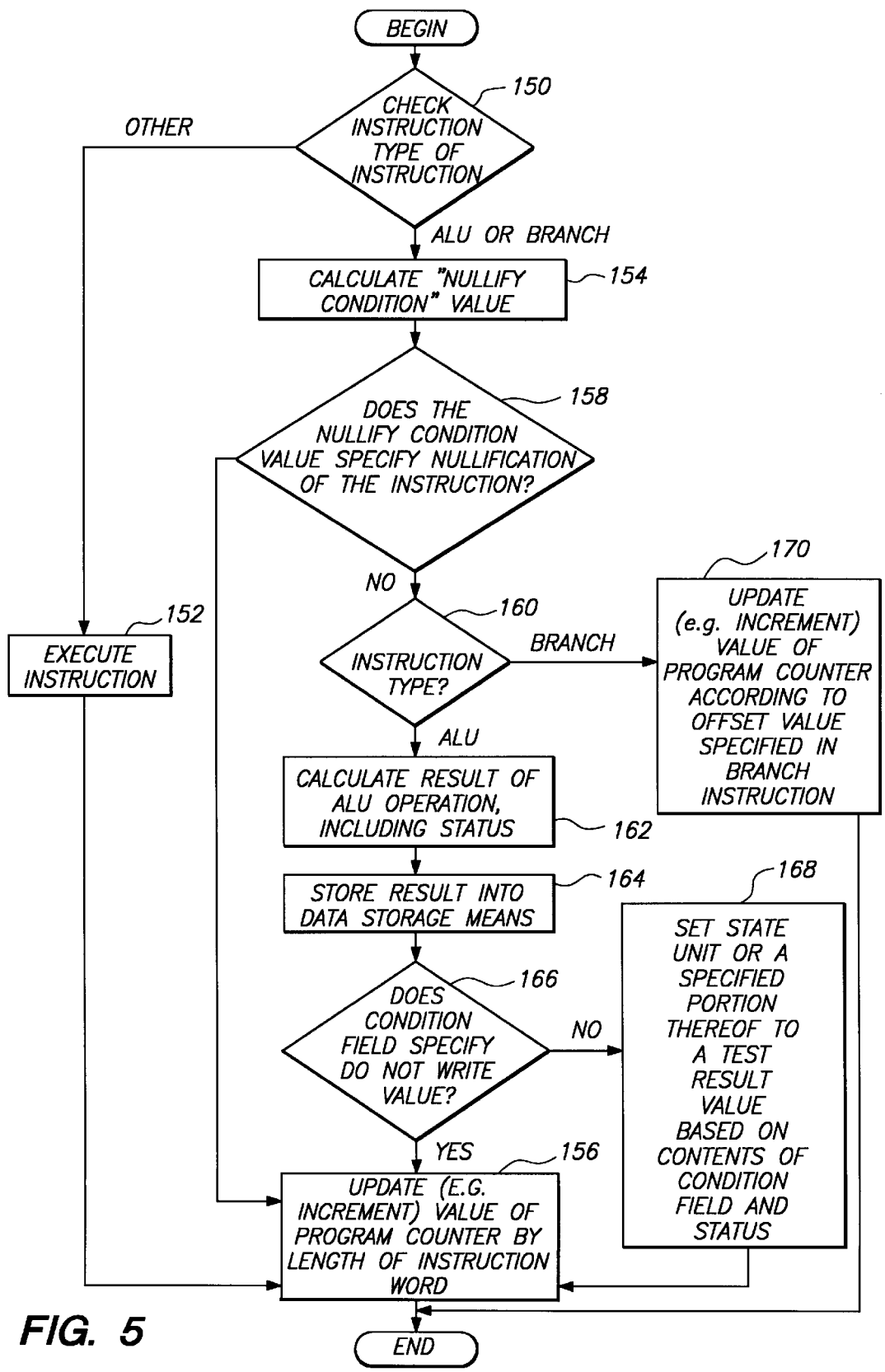
FIG. 5 is a flow chart of the general steps of the invention.

FIG. 5 shows a general flowchart of the invention. At block 150, the instruction type is checked to determine how to proceed. If it is not an ALU or a BRANCH instruction, then the instruction is executed at block 152 and the program counter is updated at block 153.

If it is an ALU or a BRANCH instruction, then at block 154, a nullify condition value is calculated by performing combinational logic on data provided in the instruction and on test result values in the state unit. The nullify condition value indicates whether to nullify the instruction, i.e. whether to store the results of the instruction in the data storage means, e.g. register file.

If at decision block 158, the nullify condition value specifies for the instruction to be nullified, then the program counter is updated at block 153. Otherwise, control passes to block 160 and the instruction type is examined. If the instruction type is ALU, i.e. the instruction performs an arithmetic computation or other logical operation, then at block 162, the result of the ALU operation, including a status, is generated. Then at block 164, the results are stored in the data storage means such as a register file or memory. At block 166, the contents of the condition field of the instruction are examined. If the condition field equals a DO NOT WRITE value, e.g. zero, then no test results are set in the state unit and at block 156 the program counter is updated, typically incremented, by the size of an instruction word.

However, if at decision block 166 the condition field being checked does not equal a DO NOT WRITE value, then at block 168, the state unit 44 or a specified portion thereof is set to a value based on the value of the condition field and the status. Then at block 156 the program counter is updated, e.g. incremented, by the length of an instruction word so that it indicates the next instruction to be executed.

If at block 160, the instruction is a BRANCH instruction, then at block 170 the program counter is updated according to an offset value specified in the instruction.

The flowchart in FIG. 5 logically represents the actions taken during the execution of an instruction embodying the invention. In an actual implementation, however, many of the computational blocks can be executed in parallel and then inhibiting final updates if appropriate. For example, the ALU calculations of the result and status in block 162 can be performed concurrently with the calculations of the nullify condition in block 154. Likewise, the next address for a branch instruction can be calculated as in block 170 concurrently with the calculation of the nullification condition in block 154. By ignoring the calculated value when the nullification condition is TRUE, it appears as if the branch calculations were not performed.

Figure 6:
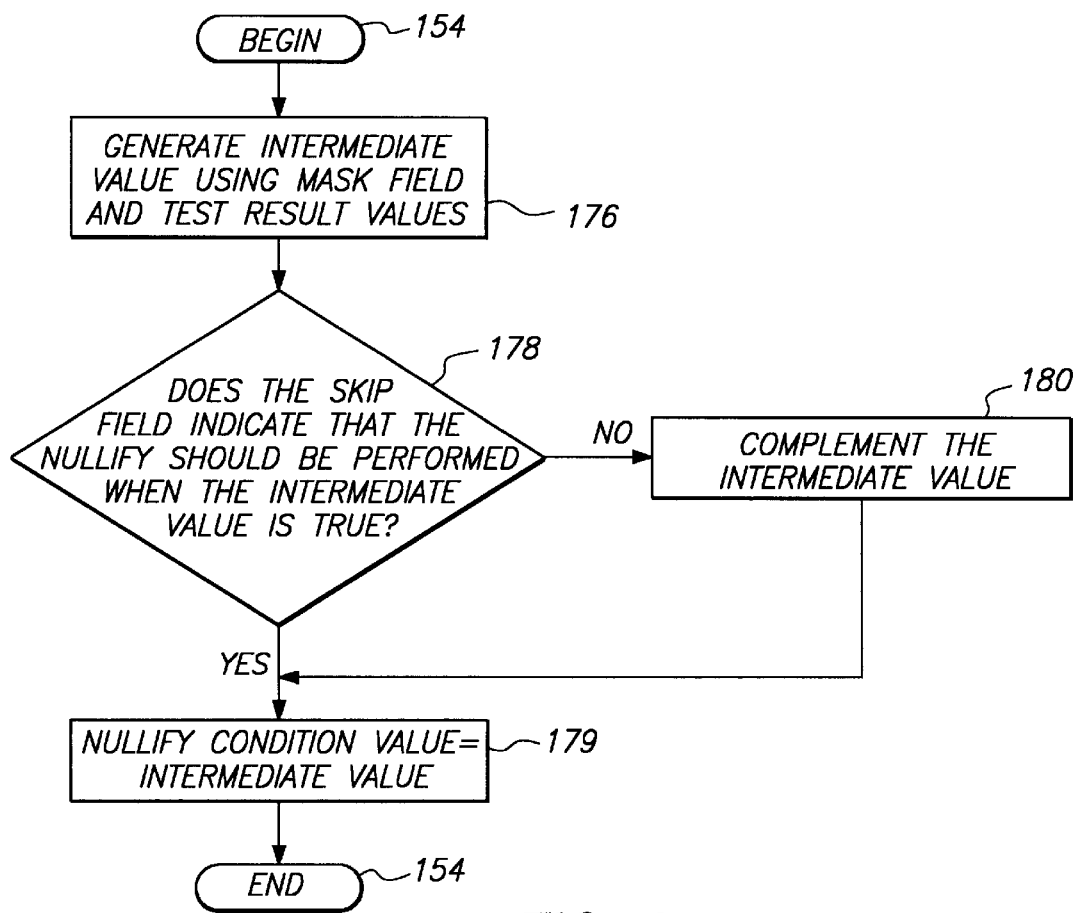
FIG. 6 is a flow chart of more detailed steps performed in block 154 of FIG. 5.

FIG. 6 shows a more detailed description of block 154 of FIG. 5. At block 176, an intermediate value is generated using the contents of the mask field of the instruction and the test result values in the state unit. At block 178 if the contents of the skip field of the instruction indicate that the instruction should be nullified when the intermediate value is TRUE, then at block 179 the nullify condition value is set to the intermediate value. Otherwise, at block 180, the intermediate value is complemented and then at block 179 the nullify condition value is set to the intermediate value.

Figure 7:
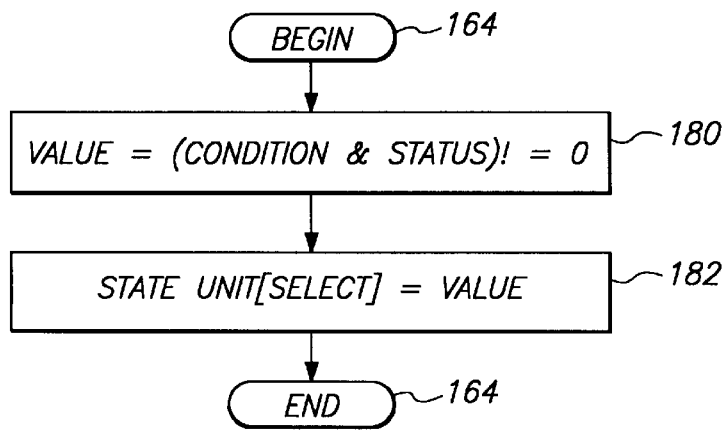
FIG. 7 is a flow chart of more detailed steps performed in block 164 of FIG. 5.

FIG. 7 shows a more detailed description of block 168 of FIG. 5. At block 180 an intermediate value to which the test data structure should be set is determined in the following manner. The value of the condition field and a status are logically "AND'ed" together and if the result is equal to FALSE, i.e. zero, then the intermediate value is set to FALSE and if the result is not equal to zero, then the intermediate value is set to TRUE. A high level representation of the operations performed in block 180 in a C programming language is the following: intermediate_value=(condition field & status)!=0. At block 182, the portion of the state unit 44 (FIG. 2) specified by a select value is set to the intermediate value. For example, if the state unit 44 (FIG. 2) is a plurality of bits, then the select value specifies which bit to set to the intermediate value. Preferably, the select value is specified in the select field 68 of the instruction (FIG. 3).

FIGS. 8–11 illustrate an apparatus for practicing the invention. For descriptive purposes, the overall apparatus has been divided at a high level between FIGS. 8 and 11 in order to differentiate between an ALU instruction and a BRANCH instruction. There is some overlap in the components described in FIGS. 8 and 11. In practice, the two apparatuses are preferably combined into a single apparatus so that there exists a single instance of any component which is featured in both figures.

Figure 8:
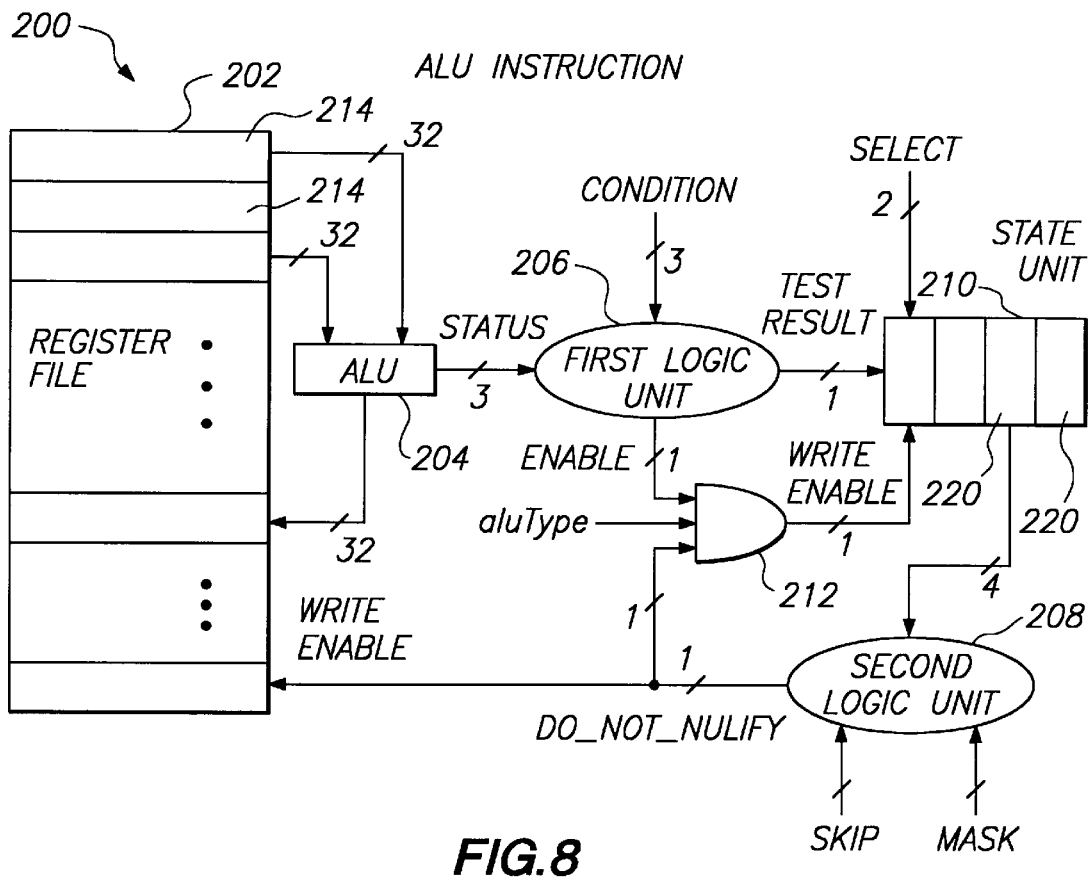
FIG. 8 shows an apparatus embodying the invention for an ALU instruction.

FIG. 8 shows an apparatus 200 to execute an ALU instruction 52 embodying the invention for use on a register-based microprocessor as shown in FIG. 2. It would be obvious to a person of ordinary skill in the art how to adapt the apparatus in FIG. 8 for a memory-based microprocessor (not shown).

The apparatus 200 comprises a register file 202, an ALU 204, a first logic unit 206, a second logic unit 208, a state unit 210 and an AND gate 212 arranged in the following manner. The register file 202 comprises one or more registers 214 for holding data and other information. The register file 202 is the same register file 40 shown in FIG. 2. The ALU 204 is coupled to the register file 202 for obtaining values, or in other words signals (the terms value and signal are herein used interchangeably) from one or more registers 204 in the register file and for setting values in one or more registers. The first logic unit 206 is connected to receive both status information from the ALU 204 and a condition specified by the condition field 66 of the ALU instruction 52. The first logic unit 206 is configured to check whether status information received from the ALU 204 indicates the condition specified by the condition field 66 of the ALU instruction 52 and to indicate/signal the outcomes of the test, herein called a "test result" and "enable", to the state unit 210 and the AND gate 212. Note that the write enable signal from the AND gate 212 affects whether that value is actually saved. In general terms, the AND gate 212 provides a mechanism for determining when to update the state unit with the test result from the first logic unit.

The state unit 210 is further arranged to receive the value of the select field 68 of the ALU instruction 52 and the output signal from the AND gate 212. The state unit 210 is the same as the state unit 44 in FIG. 2, typically replacing state unit 44. An apparatus embodying the invention has at least one state indicator. Preferably, the state unit 210 includes one or more state indicators 220, each of which specifies a particular test result. A state indicator 220 is analogous to a state indicator 45, previously described. In the following description, state unit 210 comprises multiple bits, wherein each bit is a state indicator 220. However, it would be obvious to a person of ordinary skill in the art that there are various alternative structures for a state unit 210, as previously described.

In FIG. 8, the state unit 210 comprises four state indicators 220. The actual number of state indicators 220 in a state unit 210 is limited by the number of available bits in an ALU instruction 52. A larger instruction permits a select field of a greater length, thereby allowing greater range of addresses within the state unit 210 to specified. Basically, a select field can specify 2n locations within a state unit 210, where n is the number of bits in the select field.

The second logic unit 208 is connected to receive information from the state unit 210, a skip value of the skip field 62 of the ALU instruction 52 and a mask value of the mask field 64 of the ALU instruction 52. The second logic unit 208 is further arranged to send information regarding execution or nullification of an instruction to the register file 202 and the AND gate 212.

The AND gate 212 is further coupled to receive an enable value as input from the first logic unit 206 and an instruction type indicating that the instruction is an ALU instruction. Moreover, the AND gate 212 is arranged to pass a resulting signal to the state unit 210. The instruction type comes from instruction decoding hardware (not shown) in the microprocessor. This instruction decoding hardware generates these signals as well as other signals which control the operation of the instruction.

Figure 9:
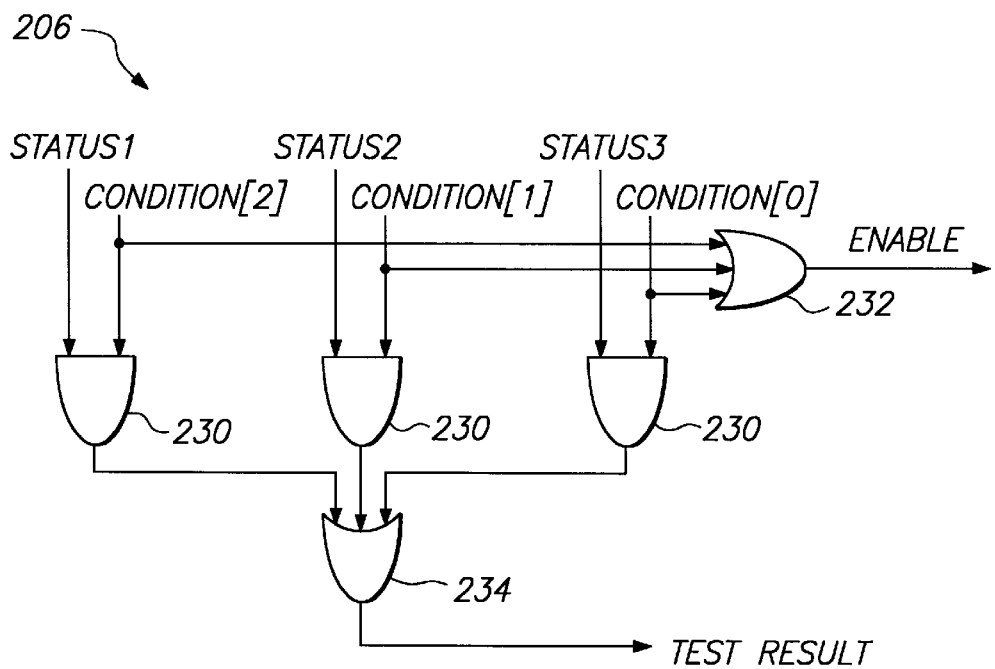
FIG. 9 shows a first logic unit of the apparatus of FIG. 8.

FIG. 9 shows in more detail a preferable embodiment of the first logic unit 206 of FIG. 7. The first logic unit 206 comprises a plurality of AND gates 230, a first OR gate 232 and a second OR gate 234.

The AND gates 230 are connected to receive the status information from the ALU 204 and the value of the condition field 66 of the ALU instruction 52. Typically, the status information and the value of the condition field have the same bit length. Moreover, the AND gates 230 are usually arranged so that there is an AND gate per bit of status information and each AND gate receives as input a bit of status information and a value from corresponding bit of the condition field.

The first OR gate 232 is coupled to receive the value of the condition field 66 of the ALU instruction 52 and to send an enable value to the AND gate 212 (FIG. 8). The second OR gate 234 is coupled to receive as input the output information from the AND gates 230 and to send a test value result to the state unit 210.

In FIG. 9, the condition value and the status value comprise three bits or signals. The number of bits in an instruction 52 is limited, thereby restricting the number of bits in the condition field and as a result the number of conditions which can be tested.

Figure 10:
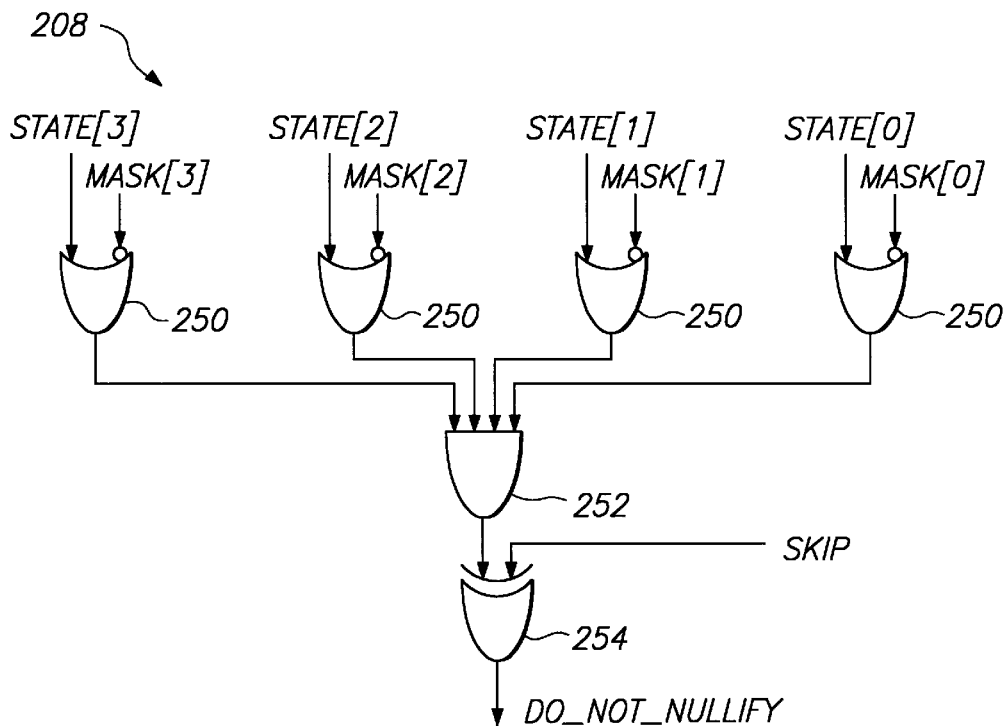
FIG. 10 shows a second logic unit of the apparatus of FIG. 8.

FIG. 10 shows in more detail a preferable embodiment of the second logic unit 208 of FIG. 8. The second logic unit 208 comprises a plurality of OR gates 250, an AND gate 252 and an EXCLUSIVE OR ("XOR") gate 254. Each OR gate 250 is coupled to receive at least two inputs, a first input from the state unit 210 and a second input of the value of the mask field 64 of an ALU instruction 52. For each OR gate 250, the signal into the second input is inverted.

The AND gate 252 is coupled to the OR gates 250 to receive as input an output signal from each OR gate 250. The XOR gate 254 is coupled to the AND gate 252 to receive as input a signal from the AND gate 252 and a signal of the value of the skip field 62 of the ALU instruction 52. The XOR gate 254 is further arranged to send signals to the register file 202 and the AND gate 212 (FIG. 8).

In operation, in a preferred embodiment, an ALU instruction 52 incorporating the invention initiates the following. The ALU 204 operations and the logic for the second logic unit 208 are computed concurrently. The logic computations for the first logic unit 206 are performed based on a status generated by the ALU and the contents of a condition field in the ALU instruction. Based on the outputs of the first logic unit 206 and the second logic unit 208, a write enable signal for the state unit 210 is then generated by the AND gate 212. Although both the ALU operations and the second logic unit computations are performed concurrently, the results of the second logic unit computations sometimes inhibits the updating of the register file, or other storage unit such as memory in a memory-based architecture, with the results of the ALU operations, thereby effectively causing it to appear as though the ALU operations were not performed.

In an alternative embodiment, rather than performing the ALU operations concurrently with the second logic unit's calculations, those ALU operations may be delayed until after the second logic unit's computations are completed and then performed only if the instruction is not nullified.

In more detail, according to a preferred embodiment, the concurrent computations of the ALU and the second logic unit 208 are as follows. The ALU 204 performs an operation as specified by the opcode field 60 on the registers specified in the ALU instruction. The ALU passes a status signal to the first logic unit 206. This status signal indicates a status condition resulting from the operation performed by the ALU.

Concurrently with the ALU operations, the data in the state unit 210 is checked to determine whether to nullify the instruction. The second logic unit 208 performs a logical OR operation between corresponding bits, i.e. state indicators 220, of the state unit 210 and an inverted signal of the value of the mask field 64. The resulting signals from the OR operations are logically AND'ed together to determine which bits in the state unit 210 to test. Thus, the invention permits multiple bits to be tested in a single instruction. The resulting signal from the AND operation is EXCLUSIVELY OR'ed with the signal of the value of the skip field 62 of the ALU instruction 52 and the resulting signal, called an "do__not__nullify" signal, indicates whether the test result will be saved and whether the register file will be updated. This signal is passed to the register file 202 and as an input to the AND gate 212.

The first logic unit 206 receives the status from the ALU and a signal of the value of the condition field 66 of the ALU instruction. The value of the condition field is essentially a mask which determines which status conditions are being tested. The first logic unit 206 performs a logical AND operation between corresponding bits in the status signal and bits in the condition field of the instruction to determine a test result value. The resulting output signals from the AND operations are logically OR'ed together and the resulting test result value is passed to the state unit 210. Simultaneously, the signals of the value of the condition field 66, i.e. the bits, are logically OR'ed together and the resulting enable result is passed as an input to the AND gate 212.

The enable result from the first logic unit 206, the do__not__nullify signal from the second logic unit 208 and a signal indicating the type of instruction, e.g. ALU, are logically AND'ed together and the resulting write enable signal is passed as input into the state unit 210.

If the write enable signal indicates an update of the state unit 210, then logic within the state unit 210 or logic located elsewhere in the processor and operating on the state unit sets the state indicator 220 specified by the signal from the select field 68 of the ALU instruction 52 to the test result value received from the first logic unit 206. For example, if the data result value is "1" and the select field value specifies bit 1 of the state unit 210, then bit 1 of the state unit is set to "1".

The write enable signal indicates an update of the state unit 210 when the following conditions are satisfied: (1) the instruction itself is being executed, as indicated by a TRUE execute signal from the second logic unit 208; (2) the instruction is the type of instruction which sets the state indicator, as indicated by an ALU instruction type (branch instructions do not affect the state unit); and (3) a condition is being tested, as indicated by the enable signal from the first logic unit 206.

Figure 11:
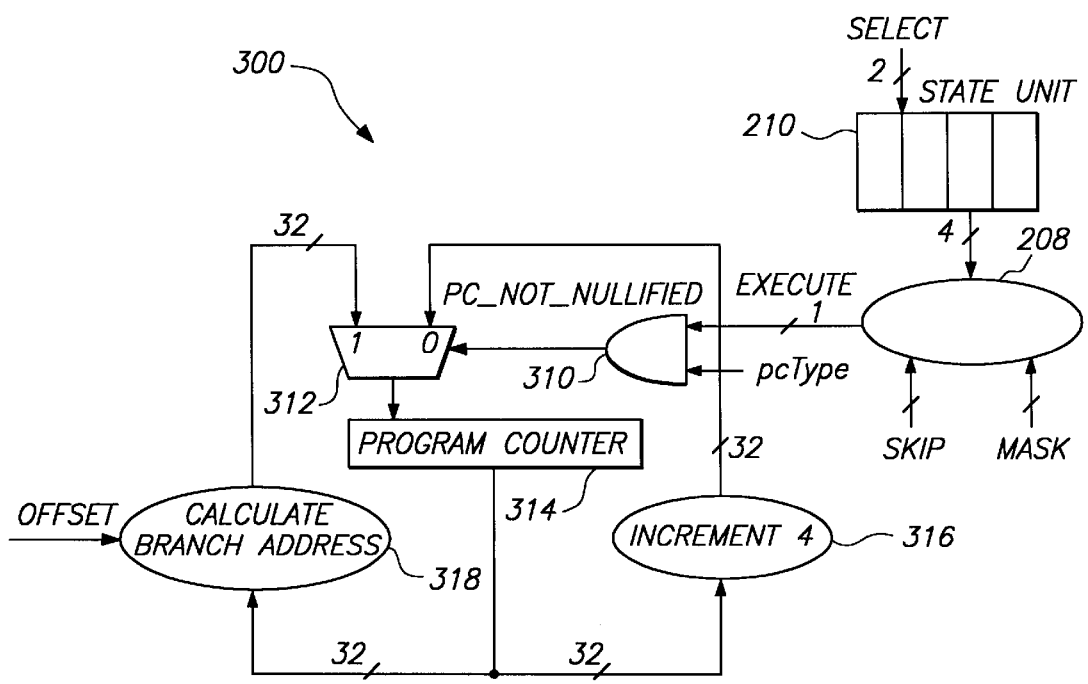
FIG. 11 shows an apparatus embodying the invention for a BRANCH instruction.

FIG. 11 illustrates an apparatus 300 for executing a conditional branch instruction as shown in FIG. 5. Apparatus 300 comprises a state unit 210, a second logic unit 208, an AND gate 310, a multiplexer 312, a program counter 314, a first adder 316 and a second adder 318. The state unit 210 and the second logic unit 208 operate as previously described in conjunction with FIG. 7.

The AND gate 310 is coupled to the second logic unit 208 to receive an execute signal, i.e. the same signal that is passed from the second logic unit to the register file in FIG. 8. The AND gate 310 is further arranged to receive a signal indicating an instruction type, e.g. an instruction type which is expected to change the program counter, such as a branch instruction. Note that 208 and 210 are the same components illustrated in FIG. 8.

The multiplexer 312 is connected to receive the resulting signal from the AND gate 310 as a selector signal and to receive input signals from the first adder 316 and the second adder 318. The program counter 314 is arranged to receive signals from the output of the multiplexer 312 and to send signals to the first adder 316 and the second adder 318.

In operation, the current value of the program counter 312 is used to begin execution of the instruction. Potential new values of the program counter are calculated. A first value is calculated by incrementing the program counter by the size of an instruction word. A second value is calculated by incrementing the program counter by the value specified in the offset field 108 of the branch instruction 100. Based on the signals generated during the execution of the branch instruction, if the branch is taken, then at the end of the instruction the program counter will be updated by the second value; otherwise it will be updated by the first value.

The determination of whether to use the first value or the second value is performed in the following manner. The state unit 210 and second logic unit 208 operate as previously described to produce an do_not_nullify signal which is logically AND'ed with a signal indicating the type of the instruction. If the instruction is the type of instruction that can update the program counter and the execute signal indicates execution of the instruction, then the output of the AND operation, called a "pc_not_nullified" signal, indicates that the program counter 314 should be updated by the value generated by the second adder 318.

The pc_not_nullify signal is passed to the multiplexer 312 which selects between the values generated by the first and second adders 316 and 318 and determines which is used to update the program counter 314.

The size of the signals related to addresses is based on the size of the program counter. Although FIG. 11 illustrates an apparatus with a 32-bit program counter, the invention is also applicable to program counters of other sizes, such as 8, 16, 24, 40, 64 bits or larger.

The invention provides a mechanism for performing the following functions within a single instruction: testing multiple test results or states, conditionally nullifying an instruction based on the result of those tests, and if an instruction is not nullified, setting a test result or state.

The following code fragment, written in "C" code as defined in ANSI X3.159-1989, illustrates an example of how the invention can be used to compute the following expression: v=absoluteValue((w+x)>=0?y:z). The values of "w" and "x" are added to generate a first intermediate term. The first intermediate term is used to generate a second intermediate term in the following manner. If the first intermediate term is greater than or equal to zero, then the second intermediate term is y; otherwise the second intermediate term is z. The final value of "v" is set to equal the absolute value of the second intermediate term.

Using this invention, the following four instructions are used to evaluate this expression:
1) toss=result=w+x; test0=(result≧0);
2) if (test0==1) {v=result=y; test1=(result≧0);}
3) if (test0==0) {v=result=z; test1=(result≧0);}
4) if (test1==0) {v=0-v;}

For descriptive purposes, "C" code notation is used to illustrate the functionality of these instructions, rather than using an assembly language description, which is often unclear was well as highly implementation-dependent. Each of the four lines represents the operation performed by a single instruction implementing this invention.

This description assumes that the argument values (w, x, y, and z) as as well as the final result (v) are all located within registers. The "toss" name refers to an otherwise-unused temporary register, which could be a register which is hardwired to zero (if one exists). The "result" is a pseudo-register name which contains an arithmetic result and can generate a test result value. State indicators are referenced using "test0" and "test1" names.

In line 1, the values of w and x are added and the result is discarded. The state indicator bit test0 is set based upon the result of this addition. If the result is negative, the test0 is set to 0; otherwise it is set to 1. The value of test0 determines which of the "y" and "z" value are selected.

In line 2, the instruction is nullified unless the test0 state indicator bit has a one value. If not nullified, this instruction copies the value from register "y" into register "v". The state indicator bit test1 is set based upon the result of this copy. If the result value is negative, test1 is set to 0; otherwise it is set to 1. The value of test1 indicates whether or not the intermediate value needs to be negated, to generate the final absolute value in step (4).

In line 3, the instruction is nullified unless the test0 state indicator bit has a zero value. If not nullified, this instruction copies the value from register "z" into register "v". The state indicator bit test1 is set based upon the result of this copy. If the result is negative, the test1 is set to 0; otherwise it is set to 1. The value of test1 indicates whether or not the intermediate value needs to be negated to generate the final absolute value in step (4).

In line 4, the instruction is nullified unless the test1 state indicator bit has a zero value. If not nullified, this instruction negates the value with register "v". This negation is only performed if "v" is negative (as detected in lines 2 or 3), ensuring that "v" represents the absolute value of the selected "y" or "z" values.

Line 1 illustrates how state indicators can be set. Line 4 shows how state indicators can be used to conditionally nullify an ALU operation. Lines 2 and 3 illustrate how an instruction can be conditionally nullified and (if not nullified) how the same instruction can set a state indicator bit which is different from the state indicator bit used to determine nullification.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

We claim:

1. A method for conditionally nullifying a current instruction on a computer system having a processor capable of interpreting and executing an instruction and a state unit, the state unit having one or more state indicators, said one or more state indicators including a first and second state indicators, said first state indicator capable of specifying a first test value and said second state indicator capable of specifying a second test value, said method comprising the steps of:

setting said first state indicator to a first test value during execution of an instruction, said instruction being executed prior to execution of a current instruction; and while processing a current instruction, determining whether to nullify said current instruction based on said first test value of said first state indicator, nullifying said current instruction based on the outcome of the determination, and if said current instruction is not nullified and said current instruction specifies setting of a second test value, setting a second test indicator by specifying an arbitrary condition field in a condition register within said current instruction.

2. A method as in claim 1 where the instruction which sets said first test value precedes said current instruction in the instruction stream by at least two instructions.

3. A method as in claim 1 where the step of determining whether to nullify includes performing a combinational logic operation on said first test value and on another test value.

4. A method as in claim 1 wherein said state unit includes two or more state indicators for holding two or more test results.

5. A method as in claim 1 wherein nullifying an instruction means not storing the result of the operation specified by the instruction.

6. A method as in claim 1 wherein a single state indicator within said state unit serves as both said first indicator and said second indicator.

7. A method as in claim 1 wherein said first indicator and said second indicator are different state indicators within said state unit.

8. A method for conditionally nullifying a current instruction on a computer system having a data storage means and a processor capable of interpreting and executing an instruction, the processor including a program counter for referencing an instruction in an instruction stream and hardware for determining an instruction type, the current instruction having a condition field specifying a status condition to be checked, the current instruction specifying an operation and zero or more operands upon which the operation is performed, said method comprising the steps of:

setting one or more state indicators, each state indicator being set during execution of a distinct instruction, said execution occurring prior to processing of a current instruction being nullified; and while said processor is processing a current instruction, determining instruction type of said instruction, if the instruction type indicates an instruction other than an ALU instruction or a BRANCH instruction, then executing said instruction and updating said program counter to reference a next instruction, if the instruction type indicates an ALU or BRANCH instruction, then calculating a nullify condition value based on said previously set one or more state indicators and if said nullify condition value indicates nullification of the instruction, then updating said program counter to reference the next instruction, if the instruction type indicates an ALU instruction and said nullify condition value indicates that said instruction is not nullified, then calculating an arithmetic logical result and status by performing the operation specified by said current instruction upon operands specified by said current instruction, storing said result in said data storage means, setting a state indicator to a test result based on a value of said condition field in said instruction, the instruction type of said current instruction and on said status, and setting said program counter to reference a next instruction; and if the instruction type indicates a BRANCH instruction and said nullify condition code indicates that said instruction is not nullified, then updating said program counter according to an offset value specified in said instruction.

9. A method as in claim 8 wherein the step of setting a state indicator to a test result is performed if a value of said condition field specifies that a test result value is to be saved in a state indicator within a state unit.

10. An apparatus for conditionally nullifying an instruction in a computer system having a state unit including multiple state indicators, each state indicator being a bit, said apparatus comprising:

means for using previously set test states of one or more state indicators to determine whether to nullify said instruction;

means for setting test states of one or more state indicators to a new condition, said state indicators being set capable of being different from the state indicators used to determine whether to nullify said instruction and capable of being located in an arbitrary condition field in a condition register while being set within said current instruction; and means for nullifying said instruction.

11. An apparatus for conditionally nullifying a current instruction in a computer system having a processor and a data storage means, said processor including hardware for determining an instruction type, said apparatus allowing during processing of the current instruction both conditional nullification based on values of one or more state indicators and if the current instruction is executed, setting of one or more state indicators, said state indicators being set capable of being different from or the same as the state indicators on which conditional nullification was based, said apparatus comprising:

an arithmetic logical unit capable of generating a status;

a first logic unit coupled to receive the status from said arithmetic logical unit, said first logic unit capable of converting the status into a test result;

a state unit coupled to receive the test result from said first logic unit, said state unit having one or more state indicators;

a second logic unit coupled to receive signals from said state unit and data from within said current instruction, said second logic unit capable of determining whether to update said data storage means, said determination based on a Boolean combination of signals from said state unit, the signals being set by previous distinct instructions and from data within said current instruction;

a combinational logic unit for determining when to update said state unit with the test result from said first logic unit, said determining means coupled to said first logic unit to receive as input signals therefrom and coupled to said second logic unit to receive as input signals therefrom and further coupled to said state unit to send signals thereto;

means for conditionally updating said data storage means based on output of said second logic unit; and means for conditionally updating a program counter, said program counter updating means coupled to receive output from said second logic unit and capable of updating a program counter based on output from said second logic unit, said program counter updating means capable of calculating an address of a next instruction to be executed based on whether a branch is taken.

12. An apparatus as in claim 11, said apparatus further comprising means for specifying where in said state unit to store the test result from said first logic unit.

13. An apparatus as in claim 12 wherein said specifying means is a field within said current instruction.

14. An apparatus as in claim 11 wherein said means for determining when to update said state unit is further coupled to receive data from said processor's hardware for determining an instruction type, said data including type information of said current instruction.

15. An apparatus as in claim 11 wherein said data received by said second logic means from within said current instruction includes a mask value specifying state indicators within said state unit and a skip value indicating nullification, said second logic unit's determination whether to update said data storage means being based on a Boolean combination of said mask value, said skip value, and values of state indicators in said state unit, such that when the Boolean combination of said skip value and values of state indicators specified by said mask value indicate nullification, said data storage means is not updated.

16. An apparatus as in claim 11 wherein said second logic means is further connected to receive a skip signal and a mask signal, the skip signal indicating whether to nullify the current instruction if the values of the state indicators specified by the mask signal are TRUE.

17. An apparatus as in claim 11 wherein said first logic unit is further arranged to receive data indicating a particular status condition to be examined.

18. A method for conditionally nullifying a current instruction on a computer system having a processor capable of interpreting and executing an instruction and having a state unit, said state unit including one or more state indicators, each state indicator capable of being set independently of other state indicators during execution of a distinct instruction, said method comprising the steps of:

while processing a current instruction,
testing one or more test results using combinational logic, each test result being stored in a separate state indicator;

determining whether to nullify said current instruction and if nullification is indicated, then nullifying said current instruction based on the outcome of the testing; and if said current instruction is not nullified, then setting a state indicator to a test result where said state indicator being set is capable of being a different state indicator than state indicators containing test results set in previous distinct instructions which were tested in said current instruction using combinational logic and setting a new condition by specifying an arbitrary condition field in a condition register within the current instruction.

19. A method for conditionally nullifying a current instruction on a computer system having a processor capable of interpreting and executing an instruction and a state unit, the state unit having a plurality of state indicators, each state indicator capable of being set independently of other state indicators and capable of specifying a result from execution of said processor of a distinct instruction, said method comprising the steps of:

setting one or more state indicators, each state indicator being set to a result from execution by said processor of a distinct instruction, said distinct instructions being executed prior to execution of a current instruction; and while processing a single instruction,
determining whether to nullify said current instruction based on results of combinational logic performed on the one or more set state indicators, nullifying said current instruction based on the outcome of the determination, and if said current instruction is not nullified and said current instruction specifies setting of at least one state indicator, then setting said specified at least one state indicator, which is capable of being located in an arbitrary condition field in a condition register, to a new condition determined during execution of the current instruction.

20. A method as in claim 19 wherein said specified at least one state indicator is a subset of or the same as said one or more state indicators being set prior to execution of a current instruction.

21. A method as in claim 20 wherein said specified at least one state indicator is different from said one or more state indicators being set prior to execution of a current instruction.

22. An apparatus for conditionally nullifying a current instruction on a computer system, said apparatus comprising:

a processor capable of interpreting and executing an instruction;

a state unit associated with said processor, said state unit having one or more state indicators, each state indicator being a bit, capable of being located in an arbitrary condition field in a condition register, said state unit capable of specifying said state indicator during execution of an instruction in which a condition is evaluated, and configured to be set independently of other state indicators during execution of a distinct instruction;

one or more registers associated with said processor;

a main memory;

a bus interconnecting said processor and said memory; and said memory being configured to store therein an instruction, said instruction having
an opcode configured to specify a particular instruction, a skip field configured to indicate at least two states, an execute state and a nullify state and capable of being switched between the at least two states, a mask field configured to select a state indicator from within said state unit, said skip field and said mask field configured to be used together in determining whether an instruction will be nullified, and an offset field configured to specify a location in said memory, said location indicating where in said memory to branch if the determination as to nullification results in execution of said instruction.

23. A memory for storing an instruction for access by a processor of a computer system, the processor being associated with a state unit, the state unit having one or more state indicators, each state indicator being a bit and configured to be set independently of other state indicators during execution of a distinct instruction, said memory comprising:

an instruction stored in the memory, the instruction comprising:
an opcode configured to identify a particular instruction,
a skip field configured to indicate at least two states, an execute state and a nullify state and capable of being switched between the at least two states,
a mask field configured to select a state indicator from within the state unit, said skip field and said mask field configured to be used together in determining whether an instruction will be nullified,
a condition field configured to specify status conditions to be checked,
a select field configured to specify a state indicator, said state indicator capable of being located in an arbitrary condition field in a condition register, said select field capable of specifying said state indicator during execution of an instruction in which a condition is evaluated, and
one or more register number fields, each register number field specifying a register.

24. A memory for storing an instruction for access by a processor of a computer system, the processor being associated with a state unit, the state unit having one or more state indicators, each state indicator being a bit and configured to be set independently of other state indicators during execution of a distinct instruction, said memory comprising:

an instruction stored in the memory, said instruction comprising:
an opcode configured to specify a particular instruction,
a skip field configured to indicate at least two states, an execute state and a nullify state and capable of being switched between the at least two states,
a mask field configured to select a state indicator from within the state unit, said state indicator capable of being located in an arbitrary condition field in a condition register, said mask field capable of specifying said state indicator during execution of an instruction in which a condition is evaluated, said skip field and said mask field configured to be used together in determining whether an instruction will be nullified,
an offset field configured to specify a location in said memory, the location indicating where in said memory to branch if the determination as to nullification results in execution of said instruction.

25. An apparatus for conditionally nullifying an instruction in a computer system having a state unit including multiple state indicators, said apparatus comprising:

means for using previously set test states of one or more state indicators to determine whether to nullify said instruction;

means for setting test states of one or more state indicators from within said instruction, said state indicators being set capable of being different from the state indicators used to determine whether to nullify said instruction and capable of being located in an arbitrary condition field in a condition register while being set within the current instruction; and means for nullifying said instruction.

26. A method for conditionally nullifying a current instruction on a computer system having a processor capable of interpreting and executing an instruction and a state unit, the state unit having one or more state indicators, state indicator in said one or more state indicators being a bit, said one or more state indicators including a first and second state indicators, said first state indicator capable of specifying a first test value and said second state indicator capable of specifying a second test value, said method comprising the steps of:

setting said first state indicator to a first test value during execution of an instruction, said instruction being executed prior to execution of a current instruction; and
while processing a current instruction,
determining whether to nullify said current instruction based on said first test value of said first state indicator,
nullifying said current instruction based on the outcome of the determination, and
if said current instruction is not nullified and said current instruction specifies setting of a second test value, then setting said second state indicator to a second test value, said second state indicator in an arbitrary condition field in a condition register being set within the current instruction.

27. An apparatus for conditionally nullifying a current instruction on a computer system, said apparatus comprising:

a processor capable of interpreting and executing an instruction;
a state unit associated with said processor, said state unit having one or more state indicators, each state indicator being a bit and configured to be set independently of other state indicators during execution of a distinct instruction;
one or more registers associated with said processor;
a main memory;
a bus interconnecting said processor and said memory; and
said memory being configured to store therein an instruction, said instruction having
an opcode configured to specify a particular instruction,
a skip field configured to indicate at least two states, an execute state and a nullify state and capable of being switched between the at least two states,
a mask field configured to select a state indicator from within said state unit, said skip field and said mask field configured to be used together in determining whether an instruction will be nullified,
a condition field configured to specify status conditions to be checked,
a select field configured to specify a state indicator, said state indicator capable of being located in an arbitrary condition field in a condition register, said select field capable of specifying said state indicator during execution of an instruction in which a condition is evaluated, and
one or more register number fields, each register number field specifying a register.

* * * * *